Feb. 19, 1963    G. LANG    3,077,960
STRUCTURAL FRAMEWORK
Filed Dec. 6, 1954    2 Sheets-Sheet 1

INVENTOR:
Günther LANG
BY
Attorney

Feb. 19, 1963
G. LANG
3,077,960
STRUCTURAL FRAMEWORK
Filed Dec. 6, 1954
2 Sheets-Sheet 2
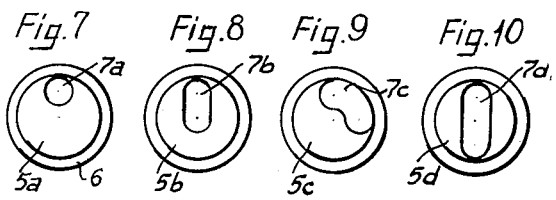
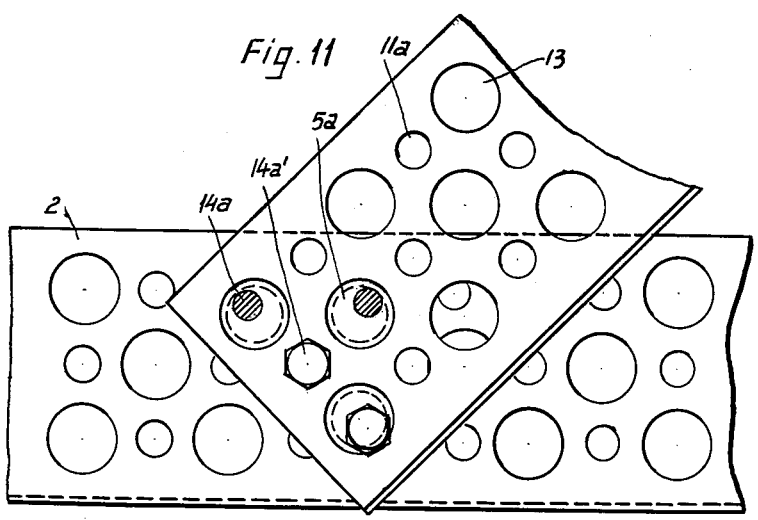
INVENTOR:
Günther LANG
BY
Attorney

United States Patent Office 3,077,960
Patented Feb. 19, 1963

3,077,960
STRUCTURAL FRAMEWORK
Gunther Lang, Kapellenstrasse 4–8, Graz, Styria, Austria
Filed Dec. 6, 1954, Ser. No. 473,365
Claims priority, application Austria Dec. 18, 1953
1 Claim. (Cl. 189—36)

The present invention relates to structural frameworks, such as girders, scaffolding, racks, furniture, toys, and a great variety of others.

Structural elements with one row or several parallel rows of equidistant circular apertures are known. Such elements can be joined in angular relationship only by a single fastening member or by means of an auxiliary connection plate. It is also known to provide L-shaped structural elements with one of the flanges carrying several rows of slots and/or holes. It is possible to join such elements securely in rectangular relationship with four fastening members but joining of the elements in different angular or in longitudinal relationship is possible only if the fastening members have a large play in the overlapping apertures of the elements, i.e. if the width of the holes, exceeds the diameter of the fastening members. Obviously, such a joint is not very secure.

It is the principal object of the present invention to provide a structural element of the above type, which may be securely joined with a like element by means of several fastening members in any desired angular relationship.

It is also an object of the invention to provide inserts or bushings and connecting pieces to provide improved joints of structural elements of this type.

The above and other objects are accomplished in accordance with this invention by providing a structural element having at least two different diameters, apertures of larger diameters alternating with apertures of smaller diameter in each longitudinal and transverse row. The diameter of the smaller apertures is the same as that of the fastening element to be used in joining two such structural elements.

According to the invention, the joining of two structural elements with alternating apertures of different diameter is facilitated by making the larger diameter the size of the smaller diameter plus about one fifth of the center distance of the apertures. This measure is logically derived from the following consideration: when two like structural elements with equidistant apertures are joined under the largest possible angle of 45° two apertures in these elements which come close to each other without registering, however, must have a distance equal to the difference between the diagonal and the longitudinal distance of two apertures, i.e. 1.4x—x=0.4x, wherein x is the center distance of the apertures. Therefore, the diameter of two such apertures must be increased each by one half of this difference, i.e. by 0.2x, so that the registering range of such enlarged apertures may include a common circle comprising the smaller aperture diameter, such common circle serving to receive the fastening member.

The fastening member used in joining the structural elements of the invention may be a screw bolt. Rivets, split and wedge bolts may also be used, as well as screws. In the latter case, the smaller apertures must be at least partially threaded to engage the screw threads.

The above and other objects, advantages and features of the invention will be more fully set forth in the following detailed description of some now preferred embodiments of the invention, taken in conjunction with the drawing wherein FIG. 1 is a top view of two superposed L-shaped structural elements of conventional aperture arrangement;

FIGS. 7–10 are top views of different embodiments of inserts or bushings;

FIG. 11 is a top view showing two structural elements, as illustrated in FIG. 5, joined together with the aid of bushings.

Figure 1:
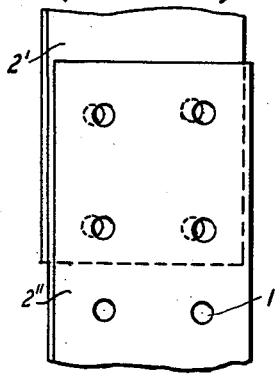

Referring now to FIG. 1, there are shown two conventional L-shaped structural elements 2' and 2", each provided with two longitudinal rows of equidistant equal-sized apertures 1, the two elements being overlapped so that the transverse rows of apertures 1 of both elements register. As will be clearly seen, the corresponding apertures in the two elements do not register but are offset by the wall thickness of outer element 2'. Obviously, the two elements cannot be connected by means of bolts of the same diameter as the diameter of apertures 1. If a bolt of a sufficiently smaller diameter is used, which may clear the registering passage between the overlapping apertures, the connection will be highly unsatisfactory since, with such a large play of the connecting bolt, there are no bearing surfaces available to transfer and absorb the tangential stresses. The firmness of such a connection depends entirely on the gripping pressure of the bolt.

Figure 2:
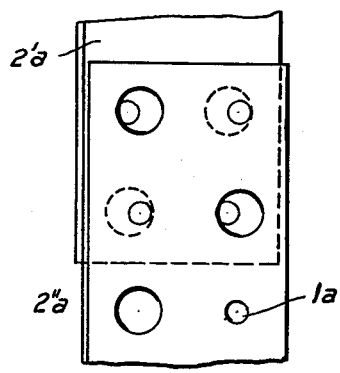
FIG. 2 shows a similar view of like elements provided with an aperture arrangement according to the invention.

In contrast to this conventional structure, FIG. 2 shows the joinder of similar L-shaped structural elements 2a' and 2a" provided with two longitudinal rows of alternating small apertures 1a and large apertures 3. In this structure, corresponding apertures in transverse rows of the elements register and permit the insertion of a fastening member having the same diameter as the small apertures. As shown, four such fastening members could be inserted to connect the two elements securely together.

Figure 3:
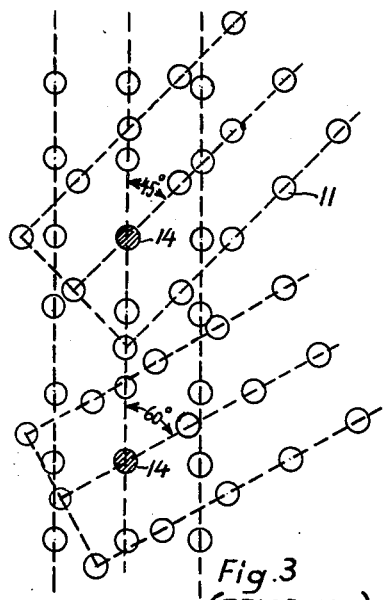
FIG. 3 is a schematic view showing the aperture arrangement of conventional structural elements joined in 45° and 60° relationship, respectively.
Figure 4:
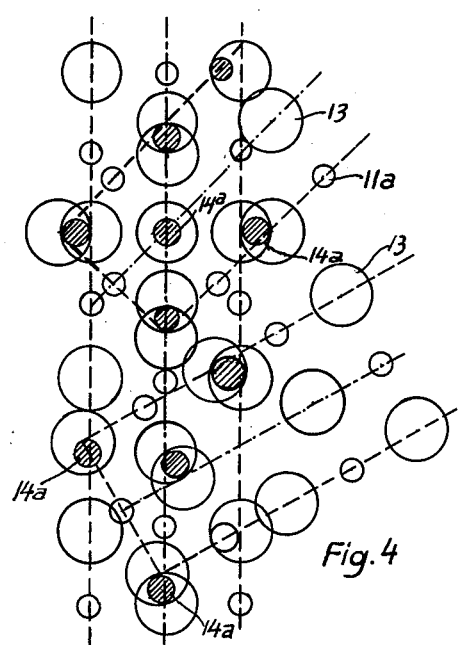
FIG. 4 shows a view similar to FIG. 3 but illustrating the novel aperture arrangement of alternating large and small apertures.

FIGS. 3 and 4 illustrate schematically the angular connection of constructional elements with conventional aperture arrangements and with an aperture system according to the invention. In both figures, there is shown a vertical element to which there are connected one element at a 45° angle (top of the figures) and another element at a 60° angle.

As clearly shown in FIG. 3, when all apertures 11 in the structural elements to be joined are of the same size, only one aperture in one element can be brought into registration with a corresponding aperture in the other element when the two elements are connected either at an angle of 45° or 60°. No other two apertures register and the elemennts can be connected only at 14. A fixed and secure angular connection is, therefore, not possible between structural elements with apertures of the same size.

Contrast this with the connections shown in FIG. 4 where the structural elements are provided with alternating small and large apertures 11a and 13. Regardless of the angle of connection between two elements, it is always possible to mount several fastening members or bolts 14a in registering apertures of the two elements. In the 45° connection at the top of the figure, for instance, six connecting bolts are shown (in section). Five connecting bolts hold together the elements at a 60° angle, as shown at the bottom of the figure.

Figure 5:
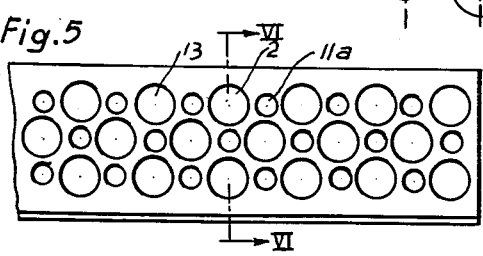
FIG. 5 is a top view showing one embodiment of the structural element of the invention.
Figure 6:
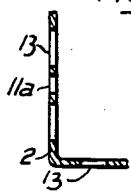
FIG. 6 is a cross section along line VI—VI of FIG. 5.

FIGS. 5 and 6 show L-shaped structural element 2 having an aperture arrangement such as illustrated schematically in FIG. 4. As shown, the element, has three longitudinal rows of alternating large and small apertures 13 and 11a, small and large apertures also alternating in the transverse rows of the aperture arrangement. Such elements are considerably lighter than conventional structural elements and, at the same time, the tensile strength of the elements as well as their resistance to pressure or bending is not impaired as much by this aperture arrangement as with an arrangement of longitudinal and transverse slots which interrupt the web of the element in large areas. In the element according to the invention, the lines of force run substantially unhindered and continuously.

The structural elements of this invention are joined together to form strong structures with the aid of inserts or bushings adapted to engage the apertures of the elements and hold the fastening member, usually a bolt. These inserts comprise a cylindrical skirt portion, which fits into the larger apertures of one of the elements, with a bore for the shaft of the connecting bolt. The bore diameter is the same as the diameter of the bolt and corresponds, therefore, to the diameter of the smaller apertures.

Such inserts or bushings have the considerable advantage that the bearing pressure created by the tangential forces at the points of connection are distributed over and absorbed by a relatively large surface, this surface depending on the thickness and the circumference of the inserts. They have the added advantage that they guarantee a very secure mounting on the connecting bolts in the larger apertures, thus assuring a very tight and firm connection.

A few embodiments of bushings for use in connecting structural elements in accordance with the present invention are shown in FIGS. 7–10. FIGS. 7 to 10 show a bushing or insert consisting of cylindrical skirt portion 5a, 5b, 5c, 5d which fits accurately and without play into the larger apertures 3 or 13 of the structural element, and also comprises a flange portion 6 which engages the element along the aperture circumference. Annulus 6 holds the bushing in position. Eccentric bore 7a, 7b, 7c, 7d receives the connecting bolt. The bearing pressure as well as the transverse pressure upon the structural element is distributed over a considerably enlarged area, as compared with the conventional washers used in bolt connections.

Different eccentric bore arrangements are illustrated. In FIG. 8, bore 7a is an eccentrically arranged cylindrical bore. Bore 7b of FIG. 9 is formed as a radial slot. In FIG. 10, bore 7c is a concentric arcuate slot extending over a quarter of a circle. FIG. 11, finally, shows diametric slot 7d forming the bore.

All bores have at least one diameter or width which corresponds accurately to the diameter of the connecting bolt so that the bolt may be received therein without play. If desired, the bores may be threaded to eliminate the need for a nut in securing the bolt in the connection.

FIG. 11 shows the connection of two L-shaped elements 2, such as shown in FIG. 5, at an angle of 45°, with the aid of bushings. As shown, the elements are held together by four bolts 14a, the heads of two bolts being removed to show the structure more clearly. Bolt 14a' is mounted in a bushing with a concentric bore, this bushing not being seen in the drawing because it is at the underside of the connection. The other bolts 14a must be mounted in bushings with eccentric bores.

It will be readily understood that the aperture formation according to the present invention may be applied to any suitable structural element. While L-shaped elements may be preferred for many purposes, flat strips, U-shaped or box-like elements may also be used. Apertured strips and rods with angular cross section may be connected to form support elements, such as beams and columns, i.e. double T-beams or supports of similar cross section.

The inserts or bushings, too, may be of any suitable form and are not limited to the embodiments particularly illustrated and described. Thus, while the skirt portion of the bushing which is inserted into the circular apertures of the structural elements must, of course, be cylindrical, the flange which supports the bushing on the element may have any desired form, such as polygonal or elliptic, although circular flanges will usually be preferred.

It will be obvious that the invention is not limited to structural elements used in building construction but may be used in a great variety of fields, such as in the building of furniture or as a toy. In the latter application, it will enable the child to use larger and stronger structural elements to build actually usable objects, i.e. small vehicles, furniture, etc., and to take them apart again, rather than to be limited to the construction of models only, as with conventional building toys. The invention may be equally used in the construction of reinforced concrete, in scaffolding, in the building of platforms or any other temporary or permanent structure.

While the invention has been described in connection with certain now preferred embodiments, it will be understood that various modifications may occur to those skilled in the art without departing from the spirit and the scope of the invention as defined in the appended claim.

What is claimed is:

A structural framework comprising a plurality of elongated structural elements, each element comprising at least one elongated web having throughout its length a plurality of identical straight rows of equidistantly spaced circular apertures of alternately smaller and larger diameter, alternating ones of said apertures being of the same diameter, web portions of adjacent ones of said elements being superposed so that at least two of the smaller diameter apertures in one web register with two larger diameter apertures in the other web, bolt means inserted in said registering apertures for providing a load-bearing coupling between said webs, each bolt means having a bolt shaft of the same diameter as the smaller diameter apertures, and a separate bushing comprising a cylindrical portion fitting into and rotatable in the larger diameter apertures and a disk-like portion coaxial with said cylindrical portion and radially extending therefrom to form an annular surface facing the adjacent one of said webs, each bushing having an eccentrically positioned axial bore of the same diameter as and receiving the bolt shaft.

References Cited in the file of this patent
UNITED STATES PATENTS

| | | |
|---|---|---|
| 1,097,185 | Oehrle | May 19, 1914 |
| 1,759,339 | Andren | May 20, 1930 |
| 1,760,638 | Gilbert | May 27, 1930 |
| 1,792,976 | Gilbert | Feb. 17, 1931 |
| 1,854,277 | Schatz | Apr. 19, 1932 |
| 2,073,889 | Trout | Mar. 16, 1937 |
| 2,125,396 | Olshevsky | Aug. 2, 1938 |
| 2,345,650 | Attwood | Apr. 4, 1944 |
| 2,632,533 | MacKenzie | Mar. 24, 1953 |
| 2,690,073 | McLaughlin | Sept. 28, 1954 |
| 2,722,294 | Lagaard | Nov. 1, 1955 |